(12) United States Patent
Kim et al.

(10) Patent No.: US 11,335,012 B2
(45) Date of Patent: May 17, 2022

(54) OBJECT TRACKING METHOD AND APPARATUS

(71) Applicant: SAMSUNG ELECTRONICS CO., LTD., Suwon-si (KR)

(72) Inventors: Seung Wook Kim, Seoul (KR); Hyunjeong Lee, Seoul (KR); Changbeom Park, Seoul (KR); Changyong Son, Anyang-si (KR); Seohyung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/227,719

(22) Filed: Apr. 12, 2021

(65) Prior Publication Data

US 2022/0122273 A1  Apr. 21, 2022

(30) Foreign Application Priority Data

Oct. 21, 2020 (KR) ........................ 10-2020-0136783

(51) Int. Cl.
*G06K 9/00* (2022.01)
*G06T 7/246* (2017.01)
*G06K 9/62* (2022.01)

(52) U.S. Cl.
CPC .............. *G06T 7/248* (2017.01); *G06K 9/627* (2013.01); *G06K 9/629* (2013.01); *G06K 9/6232* (2013.01); *G06T 2207/20084* (2013.01)

(58) Field of Classification Search
CPC ........... G06T 7/248; G06T 2207/20084; G06T 2207/20081; G06T 7/11; G06T 2207/10016; G06T 1/00; G06T 3/00; G06T 5/00; G06T 7/00; G06T 9/00; G06T 11/00; G06T 13/00; G06T 15/00; G06T 17/00; G06T 2200/00; G06T 19/00;
(Continued)

(56) References Cited

U.S. PATENT DOCUMENTS 9,940,726 B2   4/2018 Kim et al.
9,946,960 B1*  4/2018 Kim ..................... G06N 3/0454
10,628,961 B2  4/2020 Sundaresan et al.
11,017,556 B2* 5/2021 Yang ..................... G06V 40/20
(Continued)

FOREIGN PATENT DOCUMENTS

JP     2019-75116 A     5/2019
KR   10-2016-0088224 A  7/2016
(Continued)

OTHER PUBLICATIONS

SiamRPN++: Evolution of Siamese Visual Tracking with Very Deep Networks, Bo Li, Wei Wu, Qiang Wang, Fangyi Zhang, Junliang Xing, Junjie Yan. (Year: 2018).*

*Primary Examiner* — Dhaval V Patel
(74) *Attorney, Agent, or Firm* — NSIP Law

(57) ABSTRACT

An object tracking method includes generating a feature map of a search image and generating a feature map of a target image, obtaining an object classification result and a basic bounding box based on the feature map of the search image and the feature map of the target image, obtaining an auxiliary bounding box based on the feature map of the search image, obtaining a final bounding box based on the basic bounding box and the auxiliary bounding box, and tracking an object based on the object classification result and the final bounding box.

17 Claims, 7 Drawing Sheets

(58) Field of Classification Search
CPC ............. G06T 2201/00; G06T 2207/00; G06T 2210/00; G06T 2211/00; G06T 2213/00; G06T 2215/00; G06T 2219/00; G06K 9/6232; G06K 9/627; G06K 9/629; G06K 1/00; G06K 3/00; G06K 5/00; G06K 7/00; G06K 9/00; G06K 11/00; G06K 13/00; G06K 15/00; G06K 19/00; G06K 17/00; G06K 21/00; G06K 2207/00; G06K 2215/00; G06N 20/00; G06N 10/00; G06N 7/00; G06N 5/00; G06N 3/00; G06N 99/00; G06V 10/00; G06V 20/00; G06V 30/00; G06V 40/00; G06V 2201/00

See application file for complete search history.

(56) References Cited

U.S. PATENT DOCUMENTS

| | | | |
|---|---|---|---|
| 2018/0137642 | A1 | 5/2018 | Malisiewicz et al. |
| 2019/0108398 | A1 | 4/2019 | Haghighat |
| 2019/0279046 | A1 | 11/2019 | Han et al. |
| 2019/0377930 | A1 | 12/2019 | Chen et al. |
| 2021/0201487 | A1* | 7/2021 | Zhang .................... G16H 50/20 |
| 2021/0224564 | A1* | 7/2021 | Xu ....................... G06K 9/6268 |
| 2021/0295532 | A1* | 9/2021 | Lee ........................... G06T 7/73 |

FOREIGN PATENT DOCUMENTS

| | | |
|---|---|---|
| KR | 10-2018-0107930 A | 10/2018 |
| KR | 10-2019-0095592 A | 8/2019 |
| KR | 10-2020-0044171 A | 4/2020 |
| KR | 10-2020-0071799 A | 6/2020 |

* cited by examiner

OBJECT TRACKING METHOD AND APPARATUS

CROSS-REFERENCE TO RELATED APPLICATIONS

This application claims the benefit under 35 USC § 119(a) of Korean Patent Application No. 10-2020-0136783 filed on Oct. 21, 2020, in the Korean Intellectual Property Office, the entire disclosure of which is incorporated herein by reference for all purposes.

BACKGROUND

1. Field

The following description relates to an object tracking method and apparatus.

2. Description of Related Art

Object tracking refers to a technology for tracking an object that moves as time passes in successive images. The technology is used for various purposes, such as, for example, security and surveillance, video communication and compression, augmented reality (AR), or the like. It is a task that consumes a relatively great amount of time due to the amount of data included in an image. In addition, it has an extremely great complexity because it includes object recognition for recognizing an object in an image.

Object tracking may be performed through object classification and localization. Object classification is to classify a type (e.g., class or label) of an object in an image. Localization is to obtain position information of an object in an image and is obtained generally as coordinates of a bounding box.

A deep learning-based object tracking technology may extract a feature of a tracking target to be tracked using a trained neural network and a feature of an image including the tracking target, and perform object classification and localization based on the extracted features. However, a portion of operations of the neural network that extracts the features to perform object classification and localization may use an excessively great computational amount.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an object tracking method includes generating a feature map of a search image and generating a feature map of a target image, obtaining an object classification result and a basic bounding box based on the feature map of the search image and the feature map of the target image, obtaining an auxiliary bounding box based on the feature map of the search image, obtaining a final bounding box based on the basic bounding box and the auxiliary bounding box, and tracking an object based on the object classification result and the final bounding box.

The obtaining of the object classification result and the basic bounding box may include transforming the feature map of the target image to a first feature map for object classification and a second feature map for localization using a depthwise convolution, transforming the feature map of the search image to a third feature map for object classification and a fourth feature map for localization using a depthwise convolution, obtaining the object classification result based on the first feature map and the third feature map, and obtaining the basic bounding box by performing the bounding box regression based on the second feature map and the fourth feature map.

The transforming of the feature map of the target image to the first feature map for object classification and the second feature map for localization may include performing a convolution operation on the feature map of the target image, performing a first depthwise convolution operation and a second depthwise convolution operation on a result of the convolution operation, generating the first feature map for object classification by concatenating the result of the convolution operation and a result of the first depthwise convolution operation, and generating the second feature map for localization by concatenating the result of the convolution operation and a result of the second depthwise convolution operation.

The transforming of the feature map of the search image to the third feature map for object classification and the fourth feature map for localization may include performing a convolution operation on the feature map of the search image, performing a first depthwise convolution operation and a second depthwise convolution operation on a result of the convolution operation, generating the third feature map for object classification by concatenating the result of the convolution operation and a result of the first depthwise convolution operation, and generating the fourth feature map for localization by concatenating the result of the convolution operation and a result of the second depthwise convolution operation.

The obtaining of the auxiliary bounding box may include performing a convolution operation on the feature map of the search image, performing a first depthwise convolution operation on a result of the convolution operation, performing a second depthwise convolution operation on a concatenation of the result of the convolution operation and a result of the first depthwise convolution operation, and obtaining the auxiliary bounding box based on a result of the second depthwise convolution operation.

The obtaining of the auxiliary bounding box may include performing a first convolution operation on the result of the second depthwise convolution operation, and performing a second convolution operation on a result of the first convolution operation.

The obtaining of the auxiliary bounding box may include obtaining the auxiliary bounding box based on a category of an object detected from a previous frame.

The obtaining of the final bounding box may include obtaining the final bounding box based on a weighted sum of the basic bounding box and the auxiliary bounding box.

In another general aspect, an object tracking apparatus includes a memory comprising instructions and a processor configured to execute the instructions. When the instructions are executed by the processor, the processor generates a feature map of a search image and generates a feature map of a target image, obtains an object classification result and a basic bounding box based on the feature map of the search image and the feature map of the target image, obtains an auxiliary bounding box based on the feature map of the search image, obtains a final bounding box based on the basic bounding box and the auxiliary bounding box, and tracks an object based on the object classification result and the final bounding box.

The processor may transform the feature map of the target image to a first feature map for object classification and a second feature map for localization using a depthwise convolution, transform the feature map of the search image to a third feature map for object classification and a fourth feature map for localization using a depthwise convolution, obtain the object classification result based on the first feature map and the third feature map, and obtain the basic bounding box by performing the bounding box regression based on the second feature map and the fourth feature map.

The processor may perform a convolution operation on the feature map of the target image, perform a first depthwise convolution operation and a second depthwise convolution operation on a result of the convolution operation, generate the first feature map for object classification by concatenating the result of the convolution operation and a result of the first depthwise convolution operation, and generate the second feature map for localization by concatenating the result of the convolution operation and a result of the second depthwise convolution operation.

The processor may perform a convolution operation on the feature map of the search image, perform a first depthwise convolution operation and a second depthwise convolution operation on a result of the convolution operation, generate the third feature map for object classification by concatenating the result of the convolution operation and a result of the first depthwise convolution operation, and generate the fourth feature map for localization by concatenating the result of the convolution operation and a result of the second depthwise convolution operation.

The processor may perform a convolution operation on the feature map of the search image, perform a first depthwise convolution operation on a result of the convolution operation, perform a second depthwise convolution operation on a concatenation of the result of the convolution operation and a result of the first depthwise convolution operation, and obtain the auxiliary bounding box based on a result of the second depthwise convolution operation.

The processor may perform a first convolution operation on the result of the second depthwise convolution operation, and perform a second convolution operation on a result of the first convolution operation.

The processor may obtain the auxiliary bounding box based on a category of an object detected from a previous frame.

The processor may obtain the final bounding box based on a weighted sum of the basic bounding box and the auxiliary bounding box.

Other features and aspects will be apparent from the following detailed description, the drawings, and the claims.

Figure 1:
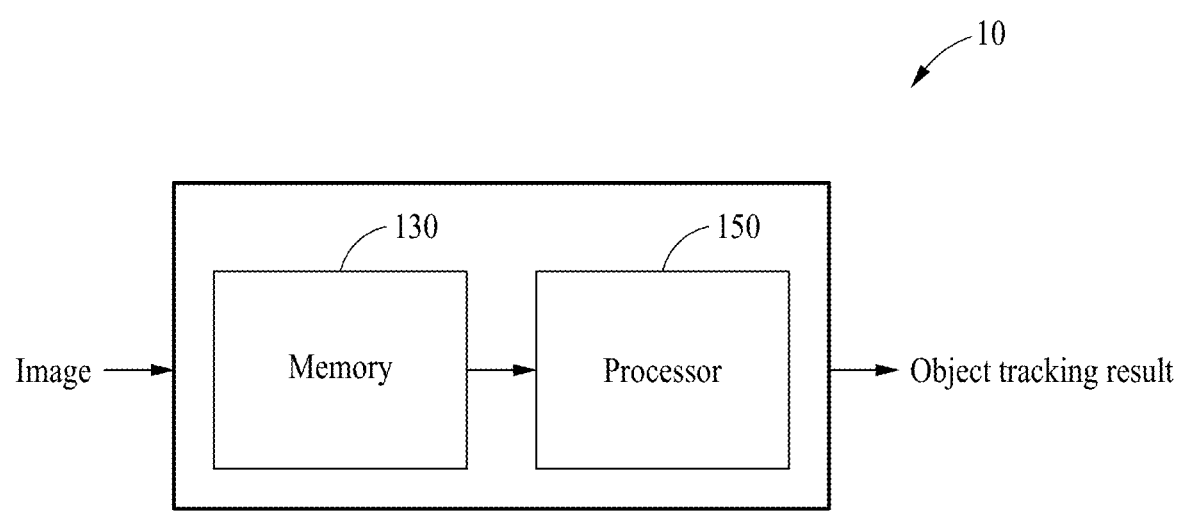
FIG. 1 illustrates an example of an object tracking apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

FIG. 1 illustrates an example of an object tracking apparatus.

An object tracking apparatus 10 may track an object in an image. The object tracking apparatus 10 may track, in each of a plurality of frames, the object that moves in the image as time passes.

The object tracking apparatus 10 may receive a position of a target object in a first frame along with an image including successive frames. The object tracking apparatus 10 may obtain a target image including the target object based on the position of the target object.

The object tracking apparatus 10 may track the target object based on the target image and a current frame. Hereinafter, a current frame on which object tracking is performed will be referred to as a search image. That is, the search image may be an image that includes a search region on which tracking a target object is performed.

To track the target object, the object tracking apparatus 10 may additionally perform auxiliary bounding box regression only using the search image. By additionally performing the auxiliary bounding box regression, the object tracking apparatus 10 may improve the performance of localization in the tracking of the target object.

The object tracking apparatus 10 may extract a feature of the search image and a feature of the target image, and transform the features to a feature for object classification and a feature for localization. A feature described herein may refer to a feature map.

The object tracking apparatus 10 may share a convolutional neural network (CNN) that performs such feature transformation for the object classification and the localization. For example, the object tracking apparatus 10 may generate a feature for each of the object classification and the localization based on a result of a convolution operation performed once. By sharing the CNN, the object tracking apparatus 10 may reduce a computational amount required for the feature transformation.

The object tracking apparatus 10 may use a network that compensates for a performance degradation that may occur as the CNN is shared for the feature transformation. For example, the object tracking apparatus 10 may compensate for the performance degradation using a depthwise CNN with a less computational amount.

Referring to FIG. 1, the object tracking apparatus 10 includes a memory 130 and a processor 150.

The memory 130 may store instructions (or a program) executable by the processor 150. For example, the instructions may include instructions to execute an operation of the processor 150 and/or an operation of each component of the processor 150.

The memory 130 may be embodied by a volatile or nonvolatile memory device.

The volatile memory device may be embodied as, for example, a dynamic random-access memory (DRAM), a static RAM (SRAM), a thyristor RAM (T-RAM), a zero-capacitor RAM (Z-RAM), or a twin-transistor RAM (TTRAM).

The nonvolatile memory device may be embodied as, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

The memory 130 may store a matrix on which an operation included in a neural network is to be performed. The memory 130 may store a result of the operation that is generated through processing of the processor 150.

The processor 150 may process data stored in the memory 130. The processor 150 may execute a computer-readable code (e.g., software) stored in the memory 130 and instructions induced by the processor 150.

The processor 150 may be a data processing device embodied by hardware having a circuit of a physical structure to execute desired operations. The desired operations may include a code or instructions included in a program, for example.

The data processing device embodied by hardware may include, for example, a central processing unit (CPU), a graphics processing unit (GPU), a neural processing unit (NPU), a multicore processor, a multiprocessor, an application-specific integrated circuit (ASIC), and a field-programmable gate array (FPGA).

Hereinafter, an object tracking method performed by the processor 150 of the object tracking apparatus 10 will be described in detail with reference to FIGS. 2 through 7.

Figure 2:
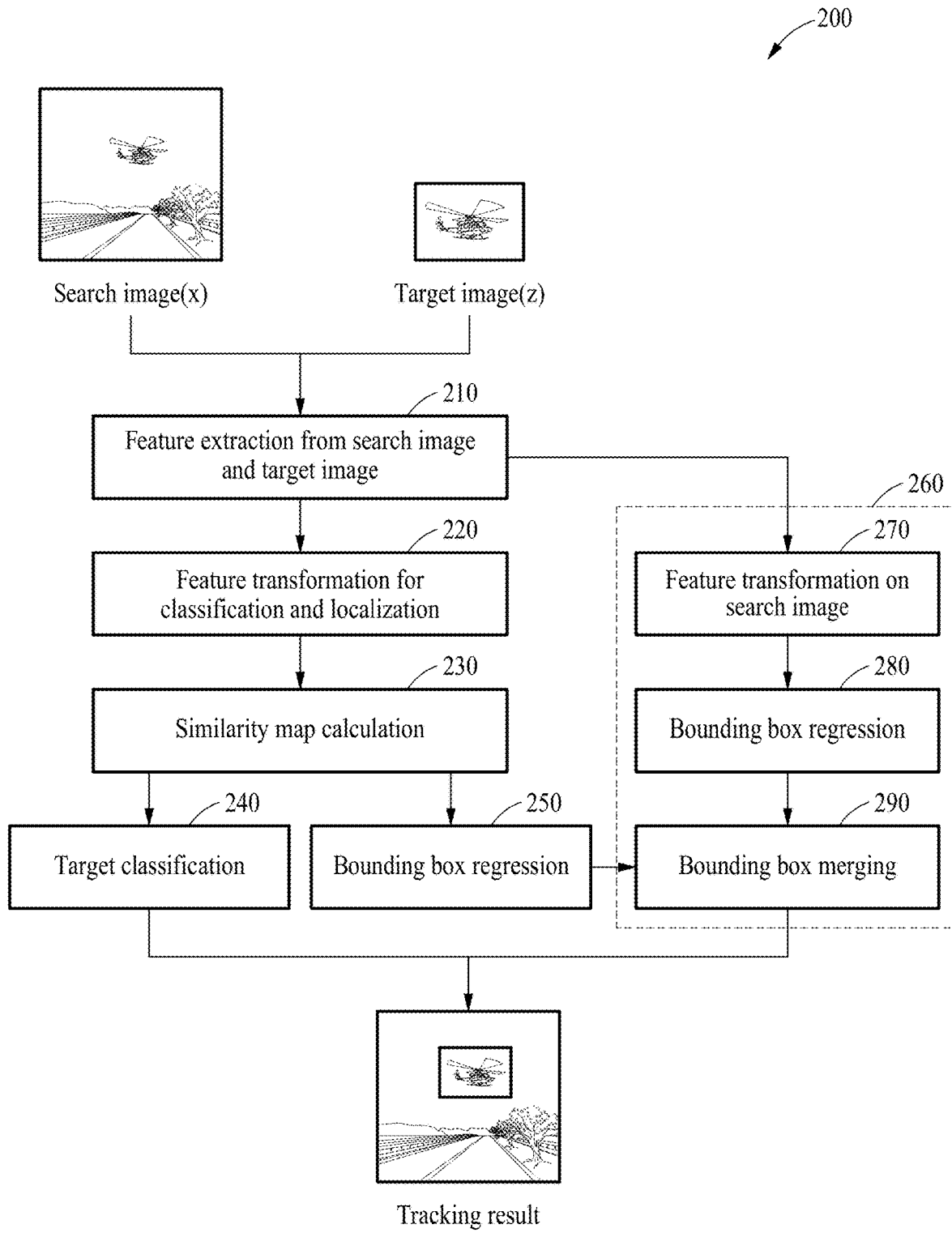
FIG. 2 illustrates an example of a conceptual flow of operations performed by the object tracking apparatus of FIG. 1.

FIG. 2 illustrates an example of a conceptual flow of operations performed by the object tracking apparatus 10 of FIG. 1.

Referring to FIG. 2, an object tracking method 200 performed by the object tracking apparatus 10 includes operations 210 through 290 to be described hereinafter.

In operation 210, the processor 150 extracts a feature of a search image and a feature of a target image, and generates a feature map of the search image and a feature map of the target image. For example, the processor 150 may generate the feature map of each of the search image and the target image using a trained neural network.

In operation 220, the processor 150 transforms the feature map of the search image and the feature map of the target image to a feature map for performing classification and a feature map for performing localization, respectively. The processor 150 may reduce a computational amount required for such feature transformation using a depthwise convolution operation.

In operation 230, the processor 150 calculates a similarity map based on each of the feature maps obtained through the feature transformation. For example, the processor 150 may calculate a similarity map for target classification and a similarity map for bounding box regression.

In operation 240, the processor 150 classifies a target in an image based on the similarity map. For example, the processor 150 may classify a target object in the search image.

In operation 250, the processor 150 performs the bounding box regression based on the similarity map. For example, the processor 150 may obtain a bounding box that indicates a position of the target object in the search image.

In operation 260, the processor 150 additionally performs auxiliary bounding box regression only using the search image. In operation 270, the processor 150 transforms the feature map of the search image to perform the auxiliary bounding box regression. In operation 280, the processor 150 performs the auxiliary bounding box regression based on a transformed feature map of the search image obtained through the transforming.

In operation 290, the processor 150 merges a bounding box obtained based on the auxiliary bounding box regression and the bounding box obtained based on the similarity map. For example, the processor 150 may obtain a more accurate final bounding box by merging an auxiliary bounding box obtained only using the feature of the search image and a basic bounding box obtained using both the feature of the search image and the feature of the target image.

Figure 3:
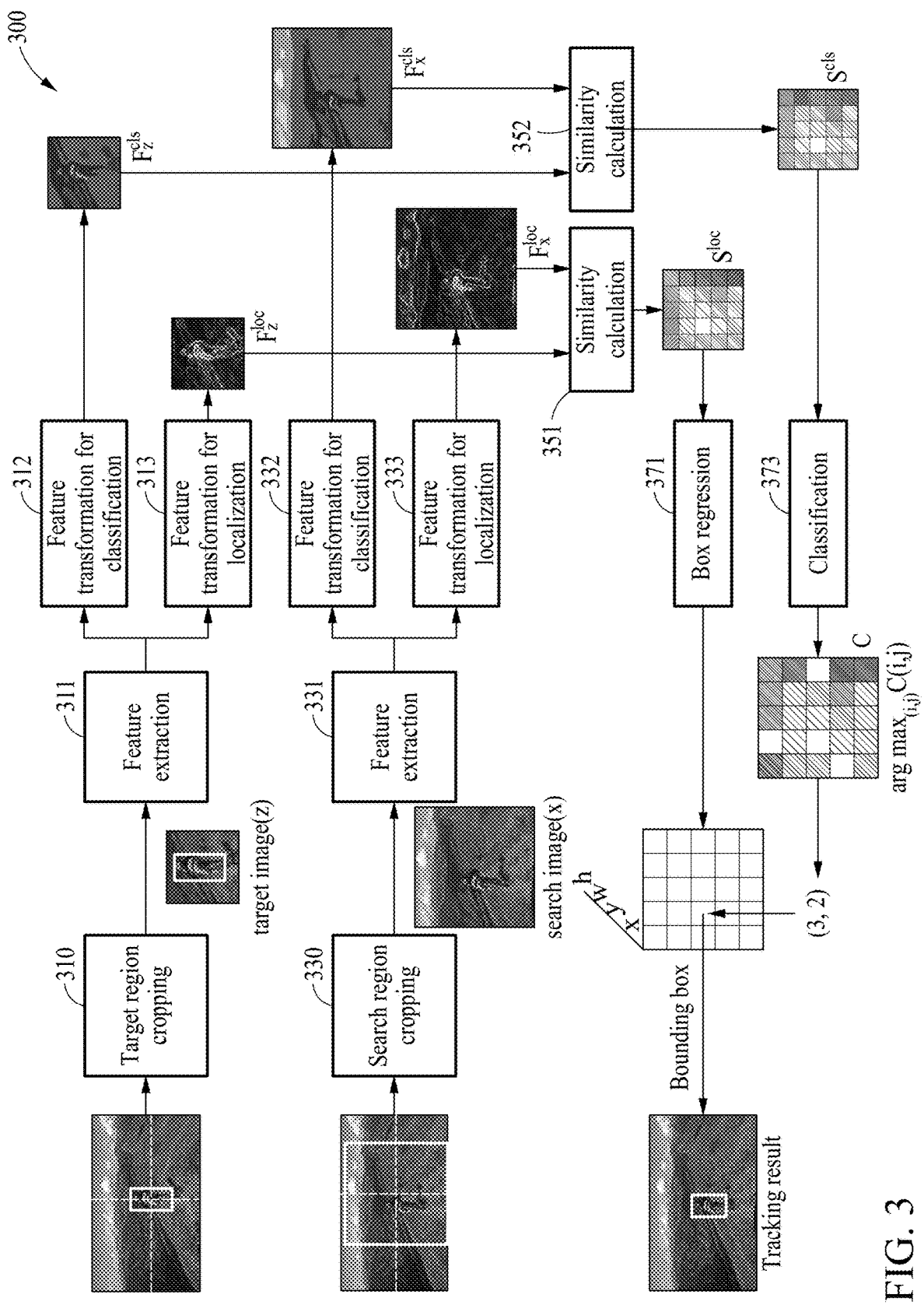
FIG. 3 illustrates an example of a flow of operations performed by the object tracking apparatus of FIG. 1.

FIG. 3 illustrates an example of a flow of operations performed by the object tracking apparatus 10 of FIG. 1.

Referring to FIG. 3, an object tracking method 300 performed by the object tracking apparatus 10 includes operations 310 through 373 to be described hereinafter.

In operation 310, the processor 150 obtains a target image by cropping a target region from an input image. For example, the processor 150 may obtain the target image of a preset size based on position information of a target in a first frame of the input image.

In operation 311, the processor 150 extracts a feature map using a trained neural network of the target image. For example, the processor 150 may obtain the feature map using the neural network that is trained to determine a feature of an object in an image.

In operations 312 and 313, the processor 150 transforms the feature map of the target image to a feature map $F_Z^{cls}$ for classification and a feature map $F_Z^{loc}$ for localization. For example, the processor 150 may obtain the feature map $F_Z^{cls}$ for classification and the feature map $F_Z^{loc}$ for localization by performing a 3×3 convolution operation (3×3 Cony) on the feature map of the target image.

Rather than performing the 3×3 convolution operation separately to obtain each of the feature map $F_Z^{cls}$ for classification and the feature map $F_Z^{loc}$ for localization, the processor 150 may perform the 3×3 convolution operation once and share an operation result.

The processor 150 may additionally perform a 3×3 depthwise convolution operation (3×3 DWConv) to obtain the feature map $F_Z^{cls}$ for classification and the feature map $F_Z^{loc}$ for localization. The processor 150 may perform the 3×3 depthwise convolution operation separately to obtain each of the feature map $F_Z^{cls}$ for classification and the feature map $F_Z^{loc}$ for localization, thereby compensating for a performance degradation that may occur by sharing the 3×3 convolution operation.

For the target image, the feature map $F_Z^{cls}$ for classification and the feature map $F_Z^{loc}$ for localization may be obtained from the first frame of the input image, and continuously used for object tracking in other frames thereafter. However, examples are not limited thereto. For example, the processor 150 may obtain the feature map $F_Z^{cls}$ for classification and the feature map $F_Z^{loc}$ for localization from an intermediate frame, and perform updating. The feature transformation performed by the processor 150 will be described in detail with reference to FIG. 6.

In operation 330, the processor 150 crops a search region from the input image. For example, the processor 150 may crop the search region based on a bounding box tracked from a previous frame. In this example, the processor 150 may crop the search region of a set size including the bounding box tracked from the previous frame. An image obtained through the cropping may be referred to herein as a search image for the convenience of description.

In operation 331, the processor 150 extracts a feature of the search image. For example, the processor 150 may obtain a feature map using a neural network that is trained to determine a feature of an object in an image.

In operations 332 and 333, the processor 150 transforms the feature map of the search image to a feature map $F_X^{cls}$ for classification and a feature map $F_X^{loc}$ for localization. Such a feature transformation on the search image performed in operations 332 and 333 may be the same as the feature transformation on the target image performed in operations 312 and 313. Thus, a repeated description will be omitted here for brevity.

In operation 351, the processor 150 calculates a similarity based on the feature map $F_X^{loc}$ of the search image and the feature map $F_Z^{loc}$ of the target image. For example, the processor 150 may generate a similarity map $S^{loc}$ for box regression based on the feature map $F_X^{loc}$ of the search image and the feature map $F_Z^{loc}$ of the target image.

In operation 352, the processor 150 calculates a similarity based on the feature map $F_X^{cls}$ of the search image and the feature map $F_Z^{cls}$ of the target image. For example, the processor 150 may generate a similarity map $S^{cls}$ for object classification based on the feature map $F_X^{cls}$ of the search image and the feature map $F_Z^{cls}$ the target image.

In operation 371, the processor 150 performs the box regression based on the similarity map $S^{loc}$. For example, the processor 150 may obtain a bounding box by performing the box regression. The processor 150 may obtain a center coordinate (x, y), a width (w), and a height (h) of the bounding box.

In operation 373, the processor 150 performs the object classification based on the similarity map $S^{cls}$. For example, the processor 150 may extract a region having a greatest value in the similarity map $S^{cls}$.

The processor 150 may track a target object by matching a result of the classification and the obtained bounding box.

The object tracking method 300 may be effective in estimating a small change in a target object because it tracks an object based on a similarity map including only a relative relationship between a target image and a search image. However, the object tracking method 300 may lose shape information of an object to be tracked and thus be vulnerable to a large change in the object.

Figure 4:
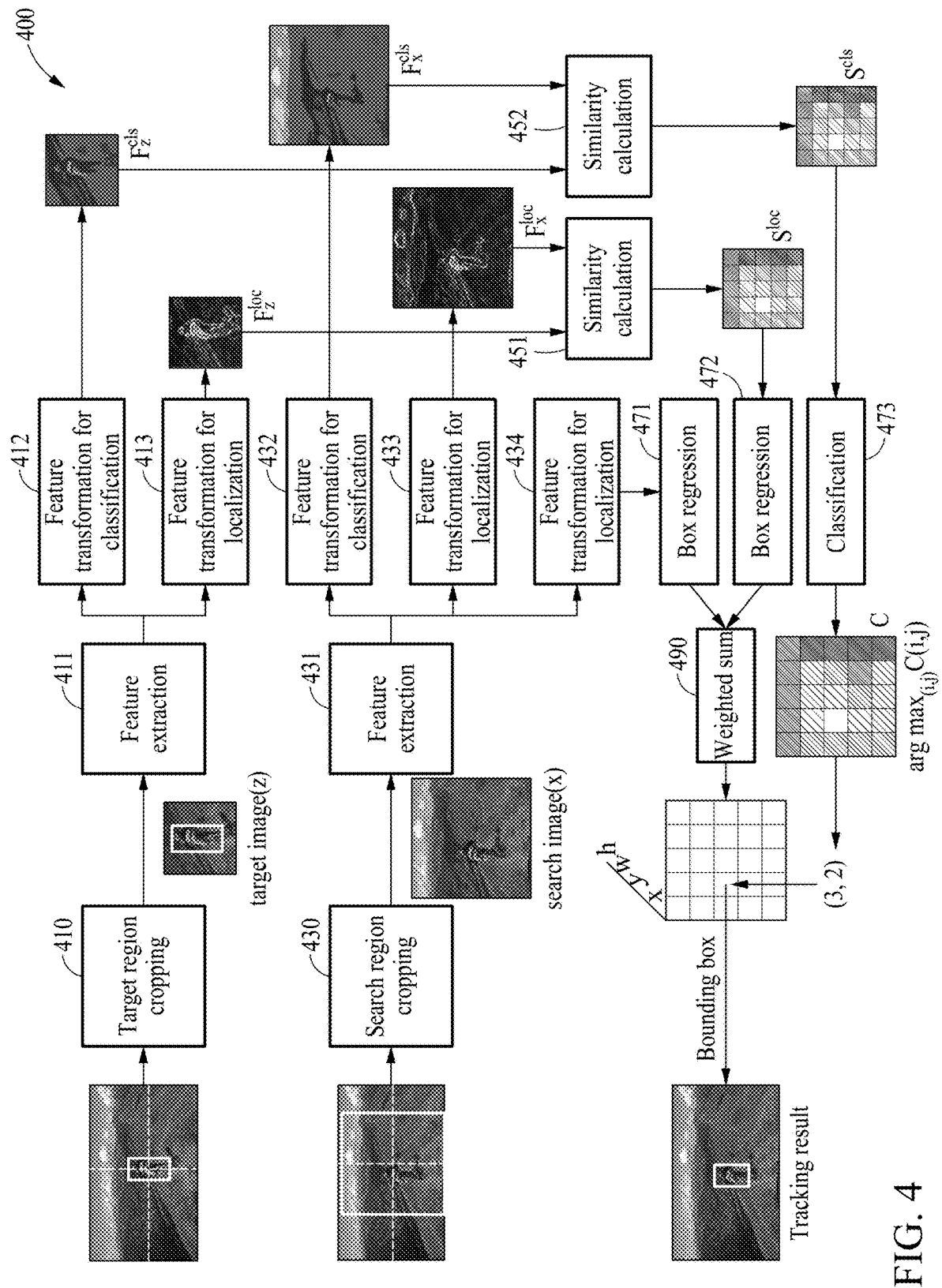
FIG. 4 illustrates another example of a flow of operations performed by the object tracking apparatus of FIG. 1.

FIG. 4 illustrates another example of a flow of operations performed by the object tracking apparatus 10 of FIG. 1.

Referring to FIG. 4, an object tracking method 400 performed by the object tracking apparatus 10 includes operations 410 through 490 to be described hereinafter.

The processor 150 may additionally perform auxiliary bounding box regression using only a search image. The auxiliary bounding box regression may be object detection performed to detect an object in the search image.

The object tracking method 400 may further include performing the auxiliary bounding box regression using only the search image, in addition to the object tracking method 300 described above with reference to FIG. 3. That is, operations 410 through 413, 430 through 433, 451, 452, 472, and 473 of the object tracking method 400 may be the same as, or correspond to, the operations 310 through 313, 330 through 333, 351, 352, 371, and 373 of the object tracking method 300, respectively. Thus, the operations of the object tracking method 400 that correspond to the operations of the object tracking method 300 will not be described repeatedly.

In operation 434, the processor 150 transforms a feature map extracted from the search image to a feature map for localization. For example, the processor 150 may perform such a feature transformation by performing a 3×3 convolution operation on the feature map of the search image.

The processor 150 may share results of a 3×3 convolution operation on feature maps of the search image performed in operations 432 and 433 for feature transformation. That is, the processor 150 may perform the 3×3 convolution operation a total of one time in operations 432 through 433 for feature transformation.

In operation 471, the processor 150 performs box regression based on a transformed feature map of the search image that is obtained through the feature transformation. For example, the processor 150 may estimate an auxiliary bounding box using only a feature of the search image without considering a similarity with a target image.

When performing the auxiliary bounding box regression, the processor 150 may adaptively perform the box regression using information of a detected object. Hereinafter, such adaptive box regression will be described in detail with reference to FIG. 5.

In operation 490, the processor 150 calculates a weighted sum of the auxiliary bounding box estimated through the box regression in operation 471 based on the feature map of the search image, and of a basic bounding box estimated through the box regression in operation 472 based on a similarity map. For example, the processor 150 may obtain a final bounding box by applying a learned weight to parameters (x, y, w, h) of each of the auxiliary bounding box and the basic bounding box that are matched to each other.

The processor 150 may generate a tracking result by matching the final bounding box and a result of object classification performed in operation 473.

The object tracking method 400 including the auxiliary bounding box regression may improve the performance of localization. The object tracking method 400 may estimate a shape of an object itself only using a feature of a search image, and thus be robust against a great change in an object to be tracked.

Figure 5:
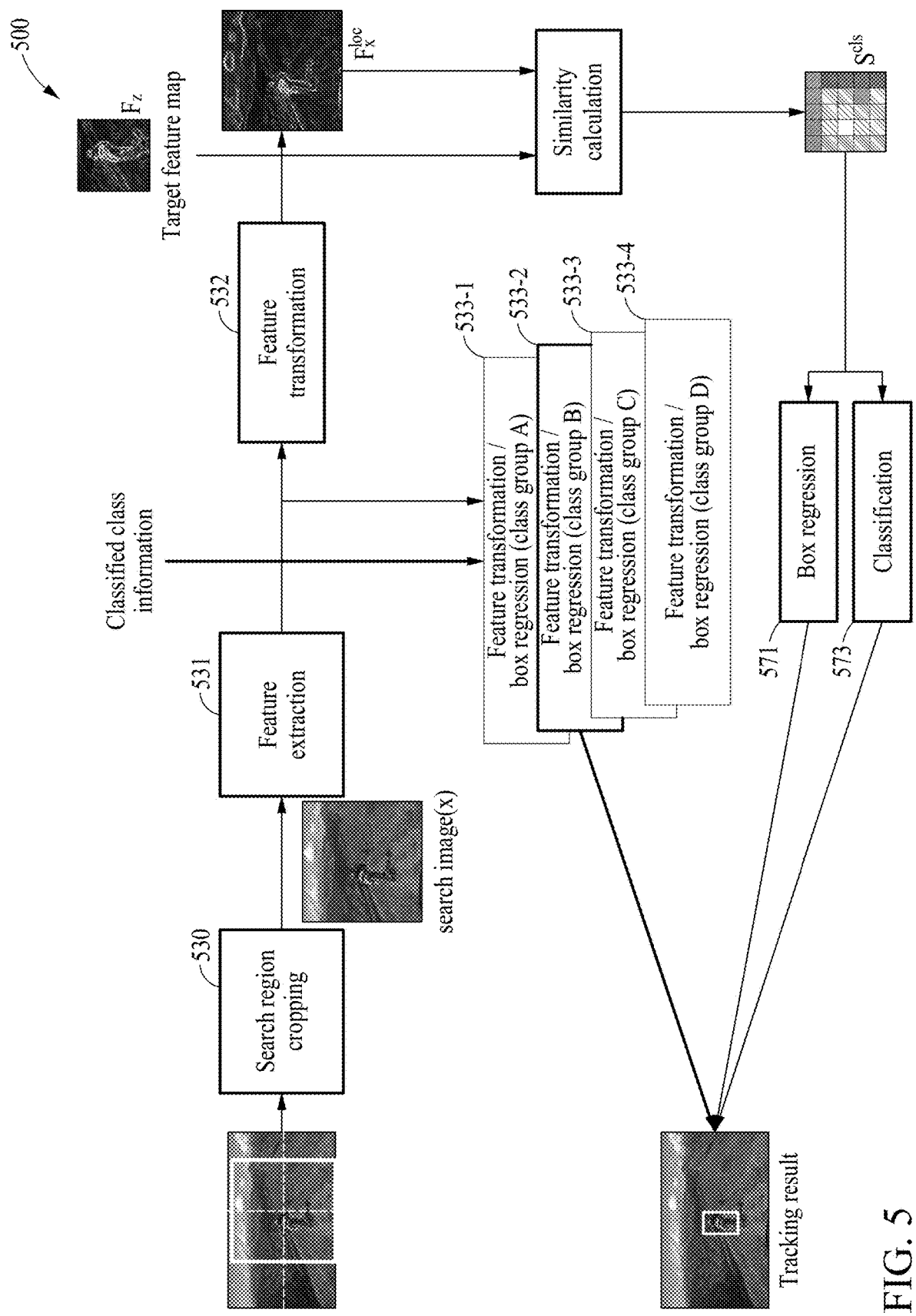
FIG. 5 illustrates an example of an operation of adaptively using class information performed by the object tracking apparatus of FIG. 1.

FIG. 5 illustrates an example of an operation of adaptively using class information performed by the object tracking apparatus 10 of FIG. 1.

Referring to FIG. 5, an object tracking method 500 performed by the object tracking apparatus 10 may include operations 530 through 573 to be described hereinafter.

In operation 530, the processor 150 crops a search region from the input image. In operation 531, the processor 150 extracts a feature of the search image. In operation 532, the processor 150 transforms the feature map of the search image to a feature map. In operation 571, the processor 150 performs the box regression. In operation 573, the processor 150 performs the object classification.

The object tracking method 500 may be a method by which auxiliary bounding box regression (feature transformation 434 for localization and box regression 471) of the object tracking method 400 described above with reference to FIG. 4 is performed adaptively based on a result of object detection. Thus, other operations of the object tracking method 500, excluding the auxiliary bounding box regression (corresponding to operations 434 and 471) of the object tracking method 400, may be performed in the same way as the object tracking method 400 is performed.

The processor 150 may adaptively perform box regression using category information of an object detected from a previous frame. The processor 150 may perform object tracking on a current frame using a neural network corresponding to a class in which the object detected from the previous frame is included, of neural networks trained on different object classes.

For example, the processor 150 may estimate a bounding box based on an auxiliary box regression network 533-2 corresponding to classified class information among auxiliary box regression networks 533-1, 533-2, 533-3, and 533-4 trained on class groups A, B, C, and D. In this example, each of the auxiliary box regression networks 533-1 through 533-4 may be a network that performs both feature transformation and box regression.

Figure 6:
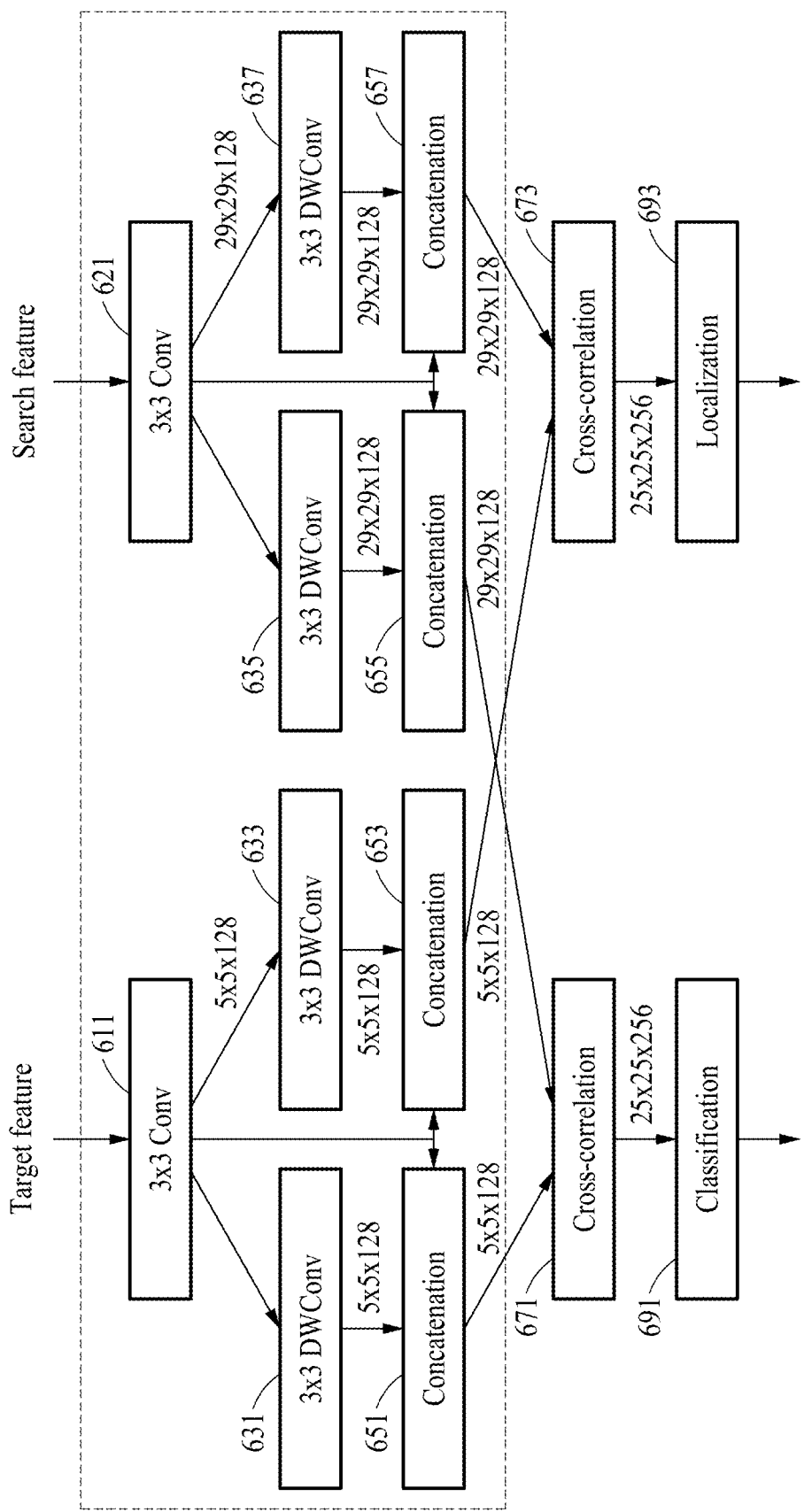
FIG. 6 illustrates an example of feature transformation performed by the object tracking apparatus of FIG. 1.

FIG. 6 illustrates an example of feature transformation performed by the object tracking apparatus 10 of FIG. 1.

The processor 150 may share results of a 3×3 convolution operation for feature transformation. Referring to FIG. 6, the processor 150 performs a first convolution operation 611 on a feature map of a target image, and performs a second convolution operation 621 on a feature map of a search image.

The processor 150 may compensate for a performance degradation that may occur by sharing the results of the 3×3 convolution operation, through a 3×3 depthwise convolution operation. A depthwise convolution may refer to a convolution operation that is performed independently for each channel. The depthwise convolution may have a relatively small computational amount because the convolution operation is performed for each channel.

For example, as illustrated, the processor 150 performs a first depthwise convolution operation 631 and a second depthwise convolution operation 633 on a result of the first convolution operation 611 performed on the feature map of the target image. The processor 150 also performs a third depthwise convolution operation 635 and a fourth depthwise convolution operation 637 on a result of the second convolution operation 621 performed on the feature map of the search image.

The processor 150 generates a first feature map by concatenating a result of the first depthwise convolution operation 631 and the result of the first convolution operation 611 in operation 651, and generates a second feature map by concatenating a result of the second depthwise convolution operation 633 and the result of the first convolution operation 611 in operation 653. The first feature map may be a feature map of the target image for object classification, and the second feature map may be a feature map of the target image for localization.

Similarly, the processor 150 generates a third feature map by concatenating a result of the third depthwise convolution operation 635 and the result of the second convolution operation 621 in operation 655, and generates a fourth feature map by concatenating a result of the fourth depthwise convolution operation 637 and the result of the second convolution operation 621 in operation 657. The third feature map may be a feature map of the search image for object classification, and the fourth feature map may be a feature map of the search image for localization.

In operation 671, the processor 150 calculates a cross-correlation between the first feature map and the third feature map. The processor 150 then generates a first similarity map for object classification based on the cross-correlation between the first feature map and the third feature map.

In operation 673, the processor 150 calculates a cross-correlation between the second feature map and the fourth feature map. The processor 150 then generates a second similarity map for localization based on the cross-correlation between the second feature map and the fourth feature map.

The processor 150 performs object classification based on the first similarity map in operation 691, and performs localization based on the second similarity map in operation 693.

Figure 7:
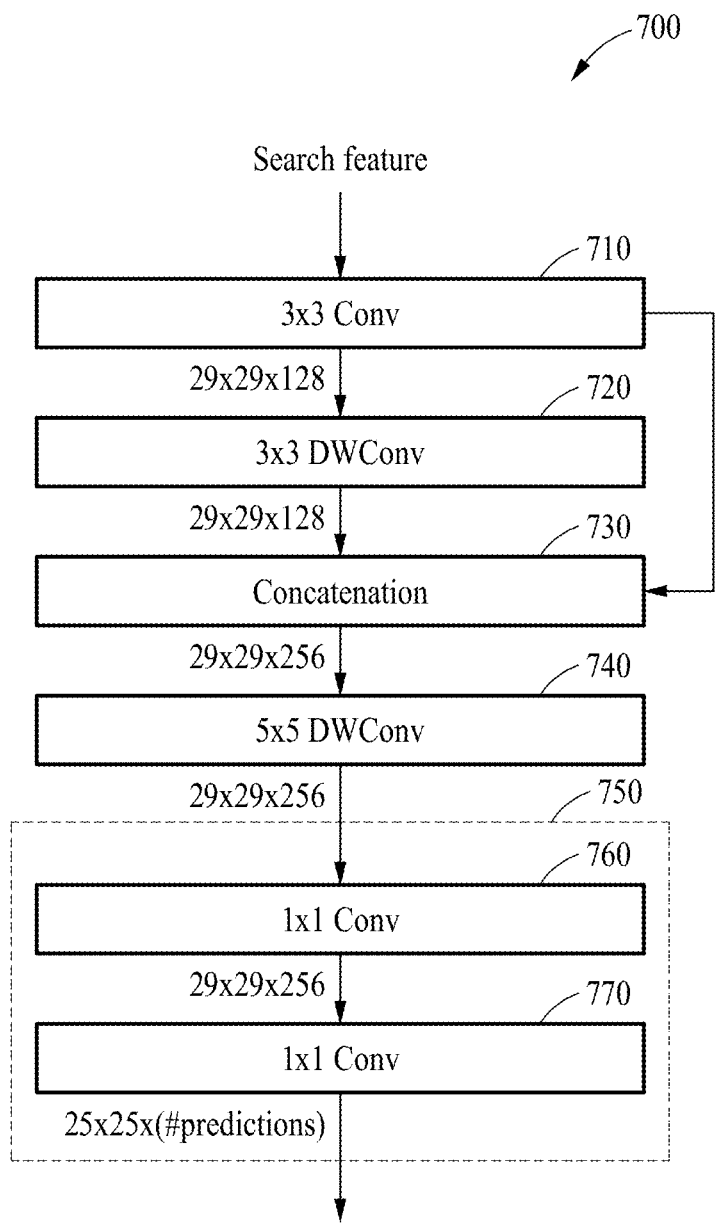
FIG. 7 illustrates an example of auxiliary box regression performed by the object tracking apparatus of FIG. 1.

FIG. 7 illustrates an example of auxiliary box regression performed by the object tracking apparatus 10 of FIG. 1.

Referring to FIG. 7, the processor 150 performs auxiliary box regression 750 based on a feature map of a search image.

The processor 150 may transform a feature map of a search image to a feature map for auxiliary box regression. For example, as illustrated, the processor 150 performs a 3×3 convolution operation 710 on the feature map of the search image, and performs a 3×3 depthwise convolution operation 720 on a result of the 3×3 convolution operation 710. Subsequently, the processor 150 obtains a feature map for auxiliary box regression by concatenating a result of the 3×3 convolution operation 710 and a result of the 3×3 depthwise convolution operation 720 in operation 730. In this example, the result of the x3 convolution operation 710 on the feature map of the search image may be the result of the second convolution operation 621 described above with reference to FIG. 6. That is, the result of the 3×3 convolution operation 621 on the feature map of the search image may be shared in the auxiliary box regression.

Subsequently, the processor 150 performs a 5×5 depthwise convolution operation 740 on a transformed feature map, and performs the auxiliary box regression 750 using a result of the 5×5 depthwise convolution operation 740. For example, the processor 150 performs a 1×1 convolution operation 760 on the result of the 5×5 depthwise convolution operation 740 and performs a 1×1 convolution operation 770 on a result of the 1×1 convolution operation 760 to generate a feature map including a bounding box estimation result.

The object tracking apparatus, other apparatuses, devices, units, modules, and components described herein with respect to FIG. 1 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An object tracking method comprising:
   generating a feature map of a search image and generating a feature map of a target image;
   obtaining an object classification result and a basic bounding box based on the feature map of the search image and the feature map of the target image;
   obtaining an auxiliary bounding box based on the feature map of the search image;
   obtaining a final bounding box based on the basic bounding box and the auxiliary bounding box; and
   tracking an object based on the object classification result and the final bounding box.

2. The object tracking method of claim 1, wherein the obtaining of the object classification result and the basic bounding box comprises:
   transforming the feature map of the target image to a first feature map for object classification and a second feature map for localization, using a depthwise convolution;
   transforming the feature map of the search image to a third feature map for object classification and a fourth feature map for localization, using a depthwise convolution;
   obtaining the object classification result based on the first feature map and the third feature map; and
   obtaining the basic bounding box by performing bounding box regression based on the second feature map and the fourth feature map.

3. The object tracking method of claim 2, wherein the transforming of the feature map of the target image to the first feature map for object classification and the second feature map for localization comprises:
   performing a convolution operation on the feature map of the target image;
   performing a first depthwise convolution operation and a second depthwise convolution operation on a result of the convolution operation;
   generating the first feature map for object classification by concatenating the result of the convolution operation and a result of the first depthwise convolution operation; and
   generating the second feature map for localization by concatenating the result of the convolution operation and a result of the second depthwise convolution operation.

4. The object tracking method of claim 2, wherein the transforming of the feature map of the search image to the third feature map for object classification and the fourth feature map for localization comprises:
   performing a convolution operation on the feature map of the search image;
   performing a first depthwise convolution operation and a second depthwise convolution operation on a result of the convolution operation;
   generating the third feature map for object classification by concatenating the result of the convolution operation and a result of the first depthwise convolution operation; and
   generating the fourth feature map for localization by concatenating the result of the convolution operation and a result of the second depthwise convolution operation.

5. The object tracking method of claim 1, wherein the obtaining of the auxiliary bounding box comprises:
   performing a convolution operation on the feature map of the search image;
   performing a first depthwise convolution operation on a result of the convolution operation;
   performing a second depthwise convolution operation on a concatenation of the result of the convolution operation and a result of the first depthwise convolution operation; and
   obtaining the auxiliary bounding box based on a result of the second depthwise convolution operation.

6. The object tracking method of claim 5, wherein the obtaining of the auxiliary bounding box comprises:
   performing a first convolution operation on the result of the second depthwise convolution operation; and
   performing a second convolution operation on a result of the first convolution operation.

7. The object tracking method of claim 1, wherein the obtaining of the auxiliary bounding box comprises:
   obtaining the auxiliary bounding box based on a category of an object detected from a previous frame.

8. The object tracking method of claim 1, wherein the obtaining of the final bounding box comprises:

obtaining the final bounding box based on a weighted sum of the basic bounding box and the auxiliary bounding box.

9. A non-transitory computer-readable storage medium storing instructions that, when executed by a processor, cause the processor to perform the object tracking method of claim 1.

10. An object tracking apparatus comprising:
a memory comprising instructions; and
a processor configured to execute the instructions,
wherein, when the instructions are executed by the processor, the processor is configured to:
generate a feature map of a search image and generate a feature map of a target image;
obtain an object classification result and a basic bounding box based on the feature map of the search image and the feature map of the target image;
obtain an auxiliary bounding box based on the feature map of the search image;
obtain a final bounding box based on the basic bounding box and the auxiliary bounding box; and
track an object based on the object classification result and the final bounding box.

11. The object tracking apparatus of claim 10, wherein the processor is configured to:
transform the feature map of the target image to a first feature map for object classification and a second feature map for localization, using a depthwise convolution;
transform the feature map of the search image to a third feature map for object classification and a fourth feature map for localization, using a depthwise convolution;
obtain the object classification result based on the first feature map and the third feature map; and
obtain the basic bounding box by performing the bounding box regression based on the second feature map and the fourth feature map.

12. The object tracking apparatus of claim 11, wherein the processor is configured to:
perform a convolution operation on the feature map of the target image;
perform a first depthwise convolution operation and a second depthwise convolution operation on a result of the convolution operation;
generate the first feature map for object classification by concatenating the result of the convolution operation and a result of the first depthwise convolution operation; and
generate the second feature map for localization by concatenating the result of the convolution operation and a result of the second depthwise convolution operation.

13. The object tracking apparatus of claim 11, wherein the processor is configured to:
perform a convolution operation on the feature map of the search image;
perform a first depthwise convolution operation and a second depthwise convolution operation on a result of the convolution operation;
generate the third feature map for object classification by concatenating the result of the convolution operation and a result of the first depthwise convolution operation; and
generate the fourth feature map for localization by concatenating the result of the convolution operation and a result of the second depthwise convolution operation.

14. The object tracking apparatus of claim 10, wherein the processor is configured to:
perform a convolution operation on the feature map of the search image;
perform a first depthwise convolution operation on a result of the convolution operation;
perform a second depthwise convolution operation on a concatenation of the result of the convolution operation and a result of the first depthwise convolution operation; and
obtain the auxiliary bounding box based on a result of the second depthwise convolution operation.

15. The object tracking apparatus of claim 13, wherein the processor is configured to:
perform a first convolution operation on the result of the second depthwise convolution operation; and
perform a second convolution operation on a result of the first convolution operation.

16. The object tracking apparatus of claim 10, wherein the processor is configured to:
obtain the auxiliary bounding box based on a category of an object detected from a previous frame.

17. The object tracking apparatus of claim 10, wherein the processor is configured to:
obtain the final bounding box based on a weighted sum of the basic bounding box and the auxiliary bounding box.

* * * * *